INVENTORS
Harold D. Morris.
Wallace E. Hyde, Jr.
BY
ATTORNEYS

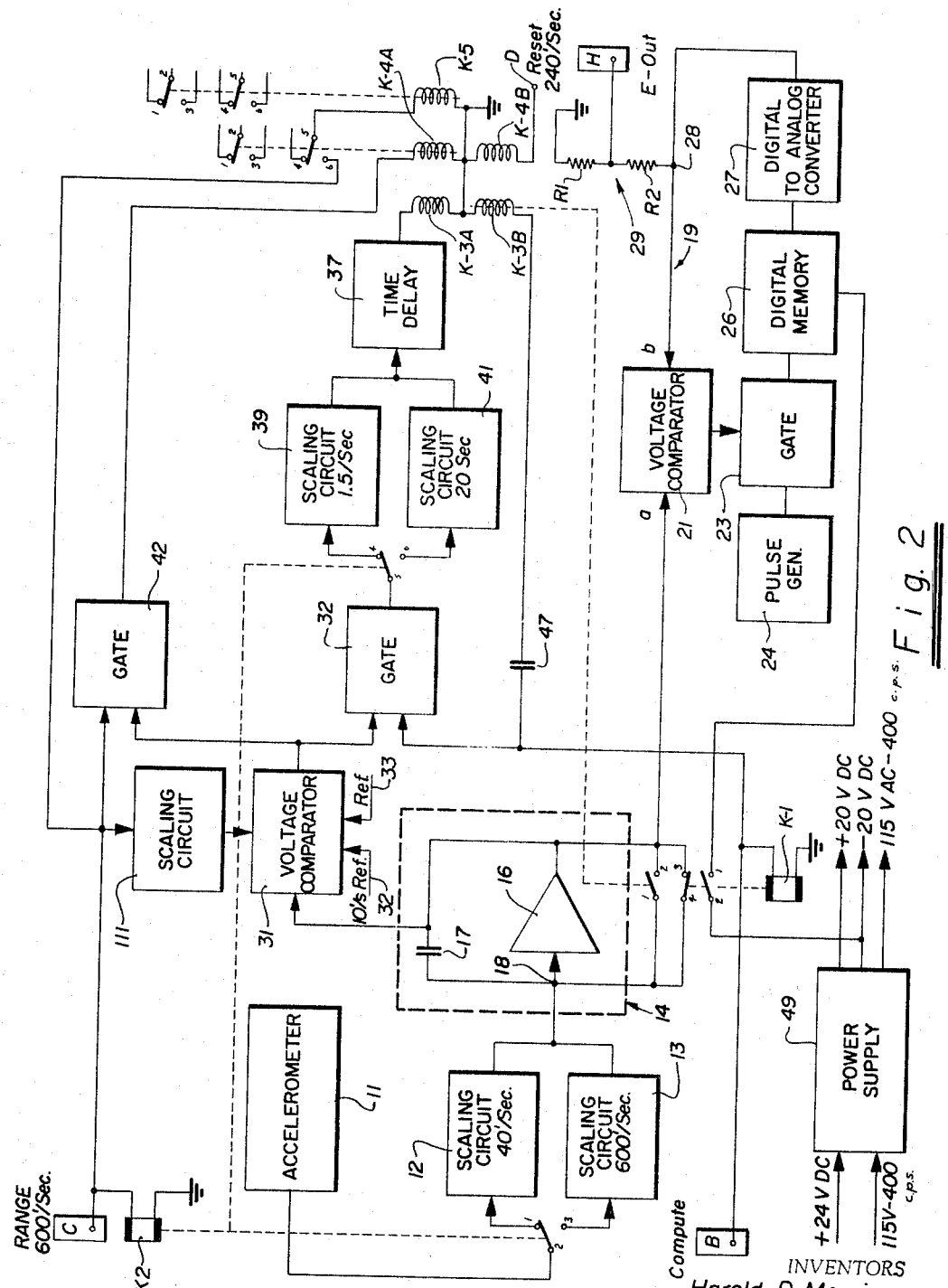

United States Patent Office 3,284,708
Patented Nov. 8, 1966

3,284,708
INTEGRATING ACCELEROMETER WITH DIGITAL MEMORY CIRCUIT
Harold D. Morris, Orinda, and Wallace E. Hyde, Jr., Moraga, Calif., assignors, by mesne assignments, to Systron-Donner Corporation, Concord, Calif., a corporation of California
Filed June 14, 1961, Ser. No. 117,088
9 Claims. (Cl. 324—70)

This invention relates to an integrating accelerometer with a digital memory system and more particularly to a dual range integrating accelerometer with digital memory circuit.

In placing objects or capsules in orbit and returning objects or capsules from orbit, it is often desirable to measure the increase in orbital velocity imparted to the object by the firing of posigrade rockets separating the object and the carrier rocket utilized for placing the object in orbit and the decrease in velocity caused by firing of the retrograde rockets at the termination of orbital flight. During certain periods of travel of the object, the object is enclosed within a sheath of ionized gas which effectively prevents radio transmission between the object and earth. There is, therefore, a need for a device which can measure the increase and decrease in velocity referred to above and store this information so that the information can be transmitted to the earth after the sheath of ionized gas no longer surrounds the object.

In general, it is an object of the present invention to provide an integrating accelerometer which can be utilized for measuring increases and decreases in velocity of an object in its travels in space.

Another object of the invention is to provide an integrating accelerometer of the above character which has a dual range to facilitate the measurement of widely different velocities.

Another object of the invention is to provide an integrating accelerometer of the above character which has a digital memory system which will store the peak value of the acceleration integral (the velocity increment) for delayed transmission to ground stations.

Another object of the invention is to provide an integrating accelerometer with a digital memory system in which long term drift which could produce error in the velocity output is eliminated.

Another object of the invention is to provide a dual velocity integrating accelerometer with a digital memory system which can be reset to make additional measurements.

Additional objects and features of the invention will appear from the following description in which the preferred embodiment is set forth in detail in conjunction with the acompanying drawing.

Referring to the drawing:

FIGURE 2 is a two dimensional block diagram of the integrating accelerometer with a digital memory system shown in FIGURE 1.

Figure 1:
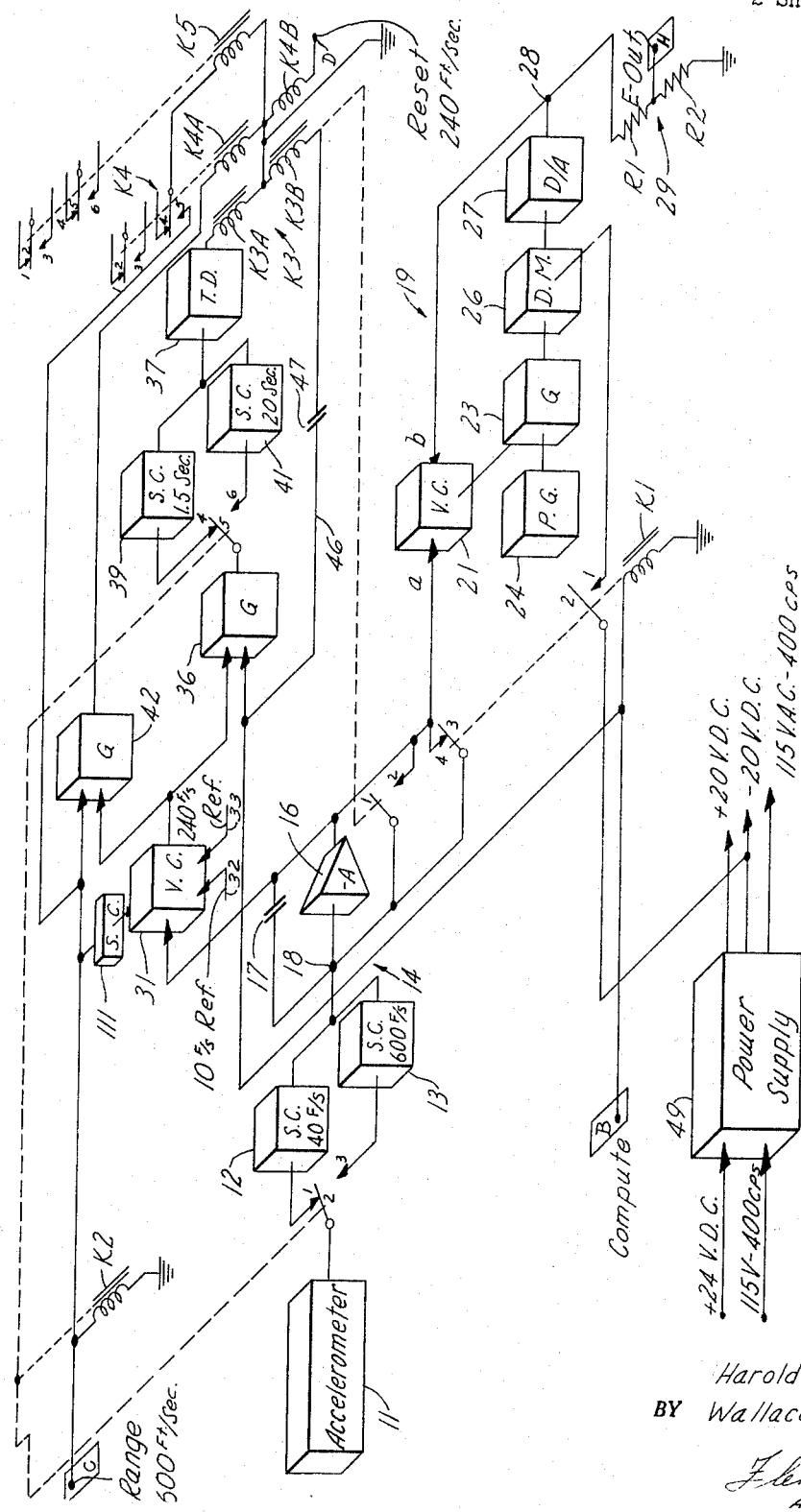
FIGURE 1 is a three dimensional block diagram of a dual range velocity integrating accelerometer with a digital memory system incorporating our invention.

In general, our dual range velocity integrating accelerometer with a digital memory system consists of an accelerometer which measures acceleration. An integrator is connected to the accelerometer for obtaining a velocity. The output of the integrator is a voltage analog of velocity, or in other words, the time integral of acceleration. A digital memory system is connected to the integrator and includes a comparator which is connected to the output of the integrator. A cut-off timer is connected to the comparator and is started in operation when the input to the comparator reaches a certain value. After a time sufficient to permit all normal acceleration to be integrated, the cut-off timer turns off the analog integrating circuitry. The digital memory system includes a digital memory register and means including a gate controlled by the comparator for supplying pulses to the digital memory register. A digital-to-analog converter is connected to the digital memory register and to the comparator. Whenever the integral supplied to the comparator exceeds the output of the digital-to-analog converter, the gate is opened to permit pulses to be generated and applied to the digital memory register. This occurs until the output from the digital-to-analog converter equals or just exceeds the integral supplied to the comparator. The gate is then closed and remains closed until the integral applied to the comparator again exceeds the output from the digital-to-analog converter. The gate remains closed when the integrator is cut off by the cut-off timer at the end of the period of integration and the quantized peak value of the acceleration integral stored in the digital memory system is continuously available at the output of the digital analog converter until power is removed or another compute-hold cycle is initiated.

As shown in the drawing, our dual range velocity integrating accelerometer with digital memory circuit consists of an accelerometer 11 which may be of a suitable type such as described in copending application Serial No. 794,487, filed February 4, 1959, now Patent No. 3,074,279, granted January 22, 1963, and entitled "Position Detecting Transducer," and now available on the market commercially as a model 4310 accelerometer manufactured by Donner Scientific Co., now Systron-Donner Corporation of Concord, California.

As described in the copending application, the accelerometer is a miniature servo system consisting of a seismic system sensitive to inertial forces, a position-error detector, a servo signal amplifier, and a restoring mechanism. Under acceleration, an inertial force tends to displace the seismic mass. A minute deflection of the seismic mass is detected in the position error detector, and the error signal is amplified in the servo amplifier to produce a current through the restoring mechanism. This current develops a force proportional to itself which is in opposition to the inertial force tending to cause displacement. When the seismic mass is stationary with respect to the case, the force is balanced, and the current is a precise measure of applied acceleration. The restoring current, passing through a precision load resistor, develops an output voltage proportional to the acceleration.

The output of the accelerometer 11 is connected to the movable contact 2 of the relay K2. The movable contact 2 is adapted to engage either stationary contact 1 or 3 of relay K2. Contact 1 of the relay K2 is connected to a scaling circuit 12, whereas the stationary contact 3 of relay K2 is connected to a scaling circuit 13. The scaling circuits 12 and 13 are connected to an integrator 14. The scaling circuits are simply precision resistors which serve to alter the time constant of the integrator for a purpose hereinafter described.

The acceleration signal, after it passes through either one of the scaling circuits 12 or 13, is converted into velocity by the electronic analog integrator 14. The electronic analog integrator consists of a chopper stabilized operational amplifier 16 of a type well known to those skilled in the art and a precision feedback capacitor 17. The scaling circuits 12 and 13 are comprised of precision input resistors to the integrator. These input resistors make it possible to produce the desired velocity range.

The accelerometer output voltage causes a current proportional to acceleration to flow in the input resistor. The amplifier 16 acts to force a current through the feedback capacitor 17 equal to the current sent to the summing junction 18 through the input resistor, thereby maintaining the junction of these components at zero potential. Since the voltage across the capacitor 17 (the output voltage of the operational amplifier) is proportional to the time integral of its charging current, and this charging current has been made proportional to acceleration, the output voltage of the operational amplifier 16 is a voltage analog of velocity, i.e. the time integral of acceleration.

The output of the integrator 14 is connected to a digital memory system 19 and will store the peak value of the acceleration integral (the velocity increment) for delayed transmission to ground stations as hereinafter described. It consists of a voltage comparator 21, a gate 23, a pulse generator 24, a digital memory register 26, and a digital-to-analog converter 27.

The voltage comparator 21 is connected to the integrator 14 and the electronic gate 23 is directly connected to the voltage comparator 21 and is controlled by the voltage comparator 21. The gate 23 controls the application of pulses from a pulse generator 24 to a digital memory 26. The digital memory 26 is of a conventional type and is comprised of seven binary flip-flop stages which count to 128 ($2^7$) in binary fashion. The number 128 was chosen because a resolution of better than 1% is desired. The next lower number ($2^6$) is only equal to 64 and, therefore, cannot meet this requirement.

The digital memory 26 is connected to the digital-to-analog converter 27. This digital-to-analog converter 27 serves to convert the digital information in the digital memory 26 to analog form by coupling resistively from the output of each binary in the digital memory 26 to a summing point 28. The coupling resistors are proportioned to make the current transferred to the summing point from each binary stage proportional to the relative weight of the binary digit represented. Thus, the summing point voltage at the summing point 28 may assume any one of 128 discrete voltage levels. When the binary storage memory 28 is driven by the pulse train from the pulse generator 24, the output from the digital to analog converter will stair-step upwardly in increments $\frac{1}{128}$ of full scale. The output of the digital-to-analog converter 28 is connected to the voltage comparator 21 and is represented by the letter $b$. The output from the integrator 14 and supplied to the voltage comparator 21 is represented by the letter $a$.

The differential voltage comparator 21 compares the output of the acceleration integrator 14 to the output of the digital-to-analog converter 27. Whenever the integral exceeds the converter output, that is, $a$ is greater than $b$, the gate 23 is opened permitting pulses from the pulse generator 24 to be applied to the digital memory register 26. As the pulses are applied to the digital memory register 26, the digital-to-analog converter 27 steps upwardly as hereinbefore described until it equals or just exceeds integrator output $a$, at which point the voltage comparator 21 against closes the pulse gate 23. The pulse gate remains closed until $a$ again exceeds $b$ and the same sequence of operations takes place.

The output of the digital-to-analog converter is supplied to a voltage divider 29 consisting of resistors R1 and R2 which sets the output level presented to the output terminal H at a predetermined voltage as, for example, 3 volts for nominal full scale velocity.

Means is provided for eliminating long term drift which could produce error in the velocity output and consists of a voltage comparator 31 which is connected to the output of the integrator 14. The voltage comparator 31 is provided with two references 32 and 33 which correspond to the value of the scaling circuits 12 and 13 supplying the integrator 14. For example, if the scaling circuit 14 is for 40 feet per second as shown in the drawing and the scaling circuit 13 is for 600 feet per second, the reference 32 is for 10 feet per second and the reference 33 is for 240 feet per second. Thus, when the integral of voltage from the integrator 14 reaches 0.25 of full scale on the 40 feet per second range (10 feet per second), or 0.40 of full scale on the 600 foot per second range (240 feet per second), an electronic gate 36 is opened to start a time delay device 37.

After sufficient time has elapsed to permit all normal acceleration to be integrated which, for example, may be 1.5 seconds for the 40 feet per second range and 20 seconds for the 600 feet per second range, the time delay device 37 serves to energize the windings K3A and K3B of the relay K3. Energization of the relay K3 closes its contacts 1 and 2 to short out the integrating capacitor 17 of the integrator 14 to thereby return the integrator voltage to zero. At the same time, relay contacts (not shown) also close across the capacitor (not shown) of the transistor time delay device 37 to reset the timer for its next operation. The desired time delays for the time delay device 37 are obtained by scaling circuits 39 and 41 which are connected to stationary contacts 4 and 6 of relay K2 and are adapted to be connected to the gate 36 by the movable contact 5 of relay K2.

The relay K2 is adapted to be energized by an exterior command signal applied to the terminal C which orders the integrating accelerometer to go into the 600 ft. per second range. This command signal C, in addition to being connected to the relay K2, is also connected to a scaling circuit 111 which is connected to the voltage comparator 31. This scaling circuit 111 shifts the voltage comparator from the reference 32 to the reference 33.

The output of the voltage comparator 31 is also connected to an electronic gate 42 which has its output connected to a relay K4 having two windings K4A and K4B. The relay K5 is energized by closing of contacts 4 and 5 of relay K4.

The pulse generator 24 can be of the free running type. However, if desired, it can be a generator which produces pulses only when the gate 23 is opened to permit pulses to be passed to the digital memory register 26. Thus, the gate 23 can be in the form of a clamp which permits the pulse generator 24 to run only at the time when it should instead of gating a pulse train from a pulse generator which is continuously operating.

Applying a compute command to terminal B causes energization of relay K1 which closes contacts 1 and 2 to reset the digital memory register 26. It also opens the contacts 3 and 4 to remove a short circuit from the integrator 14. At the same time, the compute command is applied to line 46 to apply a momentary pulse through capacitor 47 to resist relay K3, allowing a new integrating cycle to begin by removing the remaining short from the integrator 14. The relay K4 is reset by applying a reset command to the terminal D to energize the lower winding K4B to reset relay K4.

The power supply 49 which is utilized in our integrating accelerometer is of a conventional type. As can be seen, our internal circuitry utilized in our integrating accelerometer operates from a suitable positive or negative D.-C. voltage such as +20 volts D.-C. or −20 volts D.-C. This positive voltage is derived by passing 24 volt battery power through a constant current transistor to a diode voltage regulator. The negative voltage is derived from full wave rectification and filtering of the 115 volt 400 cycle per second A.-C. power input.

Operation and use of our integrating accelerometer may now be briefly described. Let it be assumed that our integrating accelerometer is mounted on an object which is to be launched into space and returned from space. Immediately prior to the separation of the object such as a space capsule from the carrier rocket, a compute command is received on the terminal B which energizes the relay K1 to reset the digital memory register 26 to zero. At the same time, the relay K3 is also reset.

Shortly thereafter, the posigrade rockets are fired to cause separation of the object or capsule from the carrier rocket by increasing the velocity of the object. The accelerometer 11 measures the acceleration causing this increase in velocity and the output voltage proportional to acceleration is supplied to the scaling circuit 12 and therethrough to the integrator 14. The output of the integrator is also a voltage which is applied to the voltage comparator 21. The voltage comparator 21 compares this output with the output from the digital-to-analog converter 27. Assuming that the voltage *a* is greater than *b*, the digital memory register will be stepped upwardly by the pulses from the pulse generator 24. In this manner, the digital memory system will store the peak value of velocity for transmission to ground stations when it is interrogated. This analog voltage proportional to the change in velocity is available on output terminal H.

As pointed out previously, it is desirable to store this information during certain portions of the travel of the object because a sheath of ionized gas surrounds the object and effectively prevents radio communication with the earth stations. After waiting for the sheath of ionized gas to dissipate, our integrating accelerometer can be interrogated to determine the increase in velocity of the object caused by the firing of the posigrade rockets.

Because the ignition time of the posigrade rockets varies significantly, it is necessary to provide means which will accommodate this variation and still permit elimination of long term drift. Long term drift is eliminated by turning off the analog integrator after it has performed its function. The integrator output is monitored by the differential voltage comparator 31 which, when the output of the integrator 14 has reached a predetermined amount as determined by the reference 32, operates a gate 36 to start the timer 37. After the predetermined time interval which is determined by scaling circuit 39, the time delay circuit 37 operates a relay K3 to short circuit the integrator 14 to prevent any additional output from the integrator 14 to be applied to the voltage comparator 21. Thereafter, within a suitable time, the digital memory system can be interrogated to determine the peak velocity attained by the object as it was accelerated by the posigrade rockets.

Now let it be assumed that the object has been orbiting in space and that it is desired to return the same to earth. At this time, a command signal is applied to the terminal C which commands the integrating accelerometer to assume the 600 ft./sec. range. This command signal energizes relay K2 and also changes the reference voltage for the comparator 31 by applying power to the scaling circuit 111. The range of the delay timer 37 and the integrator 14 is changed by closing of contacts 2 and 3 and 5 and 6 of relay K2.

At the same time, or after, a range-change command is received on terminal C a command signal is applied to terminal B to operate K1 which resets the digital memory system and also removes the short circuits from the analog integrator 14.

The retrograde rockets are then fired to terminate the orbital flight. The operation of the integrating accelerometer to measure the change in velocity is similar to that hereinbefore described. The output of the accelerometer is applied to the scaling circuit 13 and to the analog integrator 14. The output of the analog integrator is compared by the voltage comparator 21 with the output from the digital-to-analog converter 27. Again, the digital memory register 26 is stepped upwardly as long as the velocity is changing to record the peak change in velocity.

In order to prevent long term drift, a gate 36 is operated when the velocity reaches 240 ft. per second to energize the time delay circuit 37, through scaling circuit 41. At the same time, another gate 42 is operated to energize relay K4. Energization of K4 energizes relay K5. Thus, it can be seen that when the velocity reaches the reference velocity 33, the relays K4 and K5 will be operated. Such information is desirable in the event several retrograde rockets are utilized and it is desired to determine whether one or more of the retrograde rockets fired.

Thus, it can be seen that the velocity change is again stored in the digital memory system and that this information can be ascertained by interrogating the digital memory system at a suitable time as, for example, after the object has slowed down sufficiently so that it is no longer surrounded by a sheath of hot ionized gas.

A single accelerometer can be utilized as hereinbefore described for measuring both an increase and a decrease in velocity when the capsule is reoriented before firing the retrograde rockets. The impulse from the retro rockets will be in the same direction relative to the capsule axes as the impulse from the posigrade rockets so that the output voltage will always be positive.

We claim:

1. In an integrating accelerometer, an accelerometer for measuring acceleration and having an output representing the acceleration being measured, an analog integrator connected to the output of said accelerometer and having an output representing the change in velocity, and a digital memory system connected to the output of the integrator, said digital memory system including a digital memory register, a comparator connected to said integrator, a pulse generator, gate means connected to the pulse generator and operated by said comparator for applying pulses from said pulse generator to said digital memory, and digital-to-analog converting means connecting the output of said digital memory to said comparator so that said comparator causes pulses to be applied to the digital memory register when the signal supplied to the comparator by the integrator is different from the signal supplied to the comparator by the digital memory register.

2. An integrating accelerometer as in claim 1 together with time delay means connected to the integrator, the time delay means including means for energizing the same when the velocity reaches a predetermined value and for preventing the application of a signal from the integrator to the digital memory system after a predetermined interval of time.

3. An integrating accelerometer as in claim 1 together with scaling circuit means connected between the accelerometer and the integrator to permit the integrator to supply signals in different velocity ranges.

4. An integrating accelerometer as in claim 1 together with means for determining when a predetermined velocity has been exceeded.

5. In an integrating accelerometer, an accelerometer for measuring acceleration and having an output representing the acceleration being measured, an integrator connected to the output of said accelerometer and having an output representing the change in velocity and derived from the measured acceleration, a digital memory system connected to the output of the integrator for storing the peak value of the velocity output, said digital memory system consisting of a voltage comparator connected to the output of the integrator, a digital memory register, means controlled by the voltage comparator for applying pulses to the digital memory register, a digital-to-analog converter connected to the digital memory register and having its output connected to the voltage comparator, the voltage comparator comparing the voltage from the digital-to-analog converter with the voltage from the integrator and serving to cause the application of pulses to the digital memory register as long as the voltage from the integrator is greater than the voltage from the digital-to-analog converter, means for short circuiting the integrator, and reset means for resetting the digital memory register and for removing the short circuit from the integrator to permit the application of voltage to the voltage comparator from the integrator.

6. An integrating accelerometer as in claim 5 wherein said short circuiting means consists of time delay means for preventing the application of a voltage from the integrator to the voltage comparator after a predetermined length of time, said time delay means including a voltage comparator connected to the output of the integrator, a reference voltage connected to said last named voltage comparator, a time delay device, a gate connecting the output of the last named voltage comparator to the time delay device, said last named voltage comparator serving to operate said last named gate when the voltage from the integrator exceeds the reference voltage applied to the last named voltage comparator.

7. An integrating accelerometer as in claim 6 together with means connected to the integrator and means connected to the time delay device for making it possible for said integrator and said time delay device to operate in at least two ranges and means for switching said integrator and said time delay device into each of said ranges.

8. In an integrating accelerometer, an accelerometer for measuring acceleration and having an output representing the acceleration being measured, an integrator, a pair of scaling circuits, switching means connected to said scaling circuits for connecting either of said scaling circuits to the output of said accelerometer means connecting the output of said scaling circuits to said integrator, a digital memory system connected to the output of the integrator, a comparator connected to the output of the integrator, means for supplying a least two references to said comparator, a gate connected to said comparator, a time delay device, an additional pair of scaling circuits, switching means connected to said additional scaling circuits for connecting either of said additional scaling circuits to said gate, means connecting the output of the scaling circuits to said time delay device, and means connected to said time delay device for removing the output applied to the digital memory system by said integrator.

9. An integrating accelerometer as in claim 8 wherein said digital memory system includes a comparator adapted to be connected to the output of the integrator, a digital memory register, means controlled by the last named comparator for supplying pulses to the digital memory register, a digital-to-analog converter connected to the digital memory register and having its output connected to the last named comparator, the last named comparator serving to permit the application of pulses to the digital memory register when the signal applied to the last named comparator by the integrator is greater than the signal applied to the last named comparator by the digital-to-analog converter.

References Cited by the Examiner

UNITED STATES PATENTS

| | | | |
|---|---|---|---|
| 2,840,708 | 6/1958 | Sandiford | 328—43 |
| 2,913,664 | 11/1959 | Wang | 324—79 |
| 2,959,347 | 11/1960 | Kearns. | |
| 2,988,737 | 6/1961 | Schroeder | 324—70 |
| 3,015,960 | 1/1962 | Steele | 324—70 |

WALTER L. CARLSON, *Primary Examiner.*

SAMUEL BERNSTEIN, FREDERICK M. STRADER,
*Examiners.*

J. B. MILSTEAD, C. W. HOFFMANN, M. J. LYNCH,
*Assistant Examiners.*